US010552280B2

(12) United States Patent
Bulusu et al.

(10) Patent No.: US 10,552,280 B2
(45) Date of Patent: Feb. 4, 2020

(54) IN-BAND MONITOR IN SYSTEM MANAGEMENT MODE CONTEXT FOR IMPROVED CLOUD PLATFORM AVAILABILITY

(71) Applicant: MICROSOFT TECHNOLOGY LICENSING, LLC, Redmond, WA (US)

(72) Inventors: Mallik Bulusu, Bellevue, WA (US); Pingfan Song, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 15/842,611

(22) Filed: Dec. 14, 2017

(65) Prior Publication Data

US 2019/0188103 A1    Jun. 20, 2019

(51) Int. Cl.
*G06F 11/00*  (2006.01)
*G06F 11/26*  (2006.01)
*G06F 21/44*  (2013.01)
*G06F 11/22*  (2006.01)

(52) U.S. Cl.
CPC .......... *G06F 11/26* (2013.01); *G06F 11/2205* (2013.01); *G06F 21/44* (2013.01)

(58) Field of Classification Search
CPC ...................................................... G06F 11/26
USPC ........................................ 714/37, 1, 27, 4.1
See application file for complete search history.

(56) References Cited

U.S. PATENT DOCUMENTS

| | | | |
|---|---|---|---|
| 5,828,825 A * | 10/1998 | Eskandari | G01R 31/318558 714/27 |
| 5,864,653 A * | 1/1999 | Tavallaei | G06F 11/0745 710/110 |
| 5,933,614 A * | 8/1999 | Tavallaei | G06F 11/0748 710/306 |
| 6,070,253 A | 5/2000 | Tavallaei et al. | |
| 8,819,225 B2 | 8/2014 | Wang et al. | |
| 9,465,647 B2 | 10/2016 | Natu et al. | |

(Continued)

FOREIGN PATENT DOCUMENTS

EP    0768603 B1    8/2002

OTHER PUBLICATIONS

Bazhaniuk, et al., "Attacking and Defending BIOS in 2015", Retrieved from: <<https://web.archive.org/web/20150722074827/http:/www.intelsecurity.com/advanced-threat-research/content/attackinganddefendingbios-recon2015.pdf>>, Jul. 22, 2015, 98 pages.

(Continued)

*Primary Examiner* — Dieu Minh T Le
(74) *Attorney, Agent, or Firm* — Workman Nydegger

(57) ABSTRACT

Optimizations are provided for remotely debugging a node in the cloud. Initially, a SMM environment is initialized in a computer's BIOS. Then, a debug agent that is located within the SMM environment receives an instruction indicative of a chipset-specific or platform-specific health-related issue. Based on this instruction, the debug agent executes a script entry by fetching health-related information from the computer's addressable endpoints. This information includes health-related metadata and/or counter information. The debug agent then records the information. Furthermore, the debug agent obtains a resolution for the health-related issue. Here, this resolution is at least partially based on the recorded information.

20 Claims, 16 Drawing Sheets

(56) References Cited

U.S. PATENT DOCUMENTS

| | | |
|---|---|---|
| 2009/0119748 A1 | 5/2009 | Yao et al. |
| 2010/0031094 A1* | 2/2010 | Komagome ........... G11B 20/18 |
| | | 714/48 |
| 2012/0005445 A1* | 1/2012 | Escandell ........... G06F 11/3636 |
| | | 711/170 |
| 2012/0216054 A1 | 8/2012 | Cho et al. |
| 2014/0143783 A1* | 5/2014 | Bose ....................... G06F 1/324 |
| | | 718/102 |

OTHER PUBLICATIONS

Delgado, et al., "Performance Implications of System Management Mode", In Proceedings of IEEE International Symposium on Workload Characterization, Sep. 2013, pp. 1-11.

* cited by examiner

IN-BAND MONITOR IN SYSTEM MANAGEMENT MODE CONTEXT FOR IMPROVED CLOUD PLATFORM AVAILABILITY

BACKGROUND

Cloud computing has revolutionized the way in which computer systems operate. With these benefits, however, new challenges have also arisen.

Traditionally, when a computer system began to experience chipset or platform specific problems, a system administrator would initially locate the machine and then be physically present while he/she debugged it. For instance, the system administrator would plug in a JTAG debugger in order to determine what chipset or platform specific problems were occurring.

With the advent of cloud computing, however, system administrators are typically no longer able to be physically present while debugging a node (i.e. computer system/server) in the cloud. This is due, in part, because cloud datacenters are typically located very far from any populated areas. Consequently, system administrators typically are not able to quickly access the underlying chipset or platform features of the node. Because of this actuality, debugging a node's chipset or platform has become a very time intensive and laborious process. In some instances, this process can take months to complete. Accordingly, there exists a substantial need in the field to improve the processes for debugging chipset and platform problems of a node in a cloud datacenter.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed embodiments are directed to systems, hardware storage devices, and methods for determining a health state of a computer system.

Initially, a system management mode (SMM) environment is initialized in a basic input/output system (BIOS) setting of a computer system. According to the disclosed embodiments, there is a debug agent located within the SMM environment. This debug agent receives an instruction indicative of a chipset-specific health-related issue of the computer system. Based on this instruction, the debug agent executes a script entry by fetching health-related information about the computer system. This health-related information includes health-related metadata or counter information about the computer system's chipset. Next, the debug agent records the health-related information. Subsequently, the debug agent obtains a resolution for the health-related issue. Here, this resolution is based at least partially on the retrieved information.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 6 demonstrates some of the various modes that a CPU may operate in.

DETAILED DESCRIPTION

Figure 1:
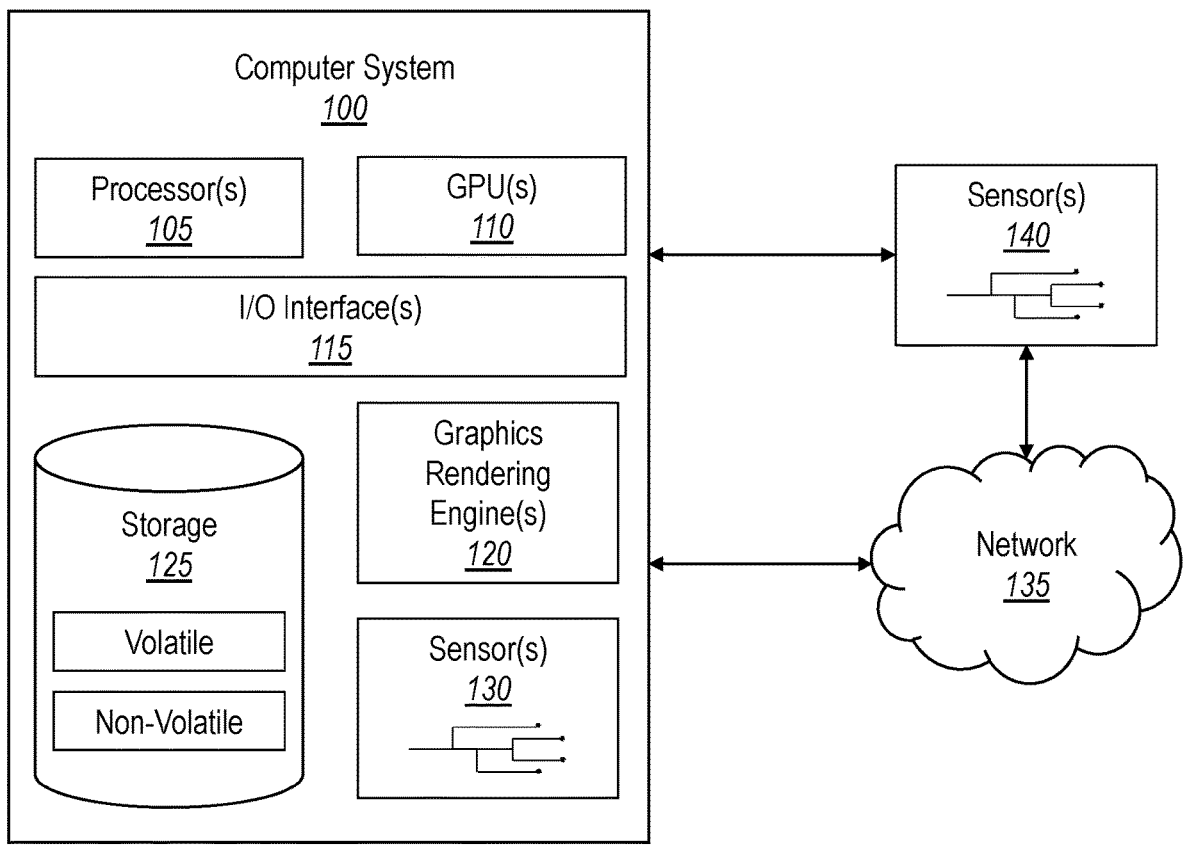
FIG. 1 illustrates an example computer system.

Disclosed embodiments are directed to systems, hardware storage devices, and methods for determining a chipset-specific health state of a computer system.

The embodiments may be implemented to overcome many of the technical difficulties and computational expenses associated with debugging the chipset and underlying hardware platform of a remote computer system. In particular, the embodiments provide a computerized, automated process for identifying and resolving chipset-specific health-related issues in a computer system that is located remotely. Such a process greatly assists system administrators in their debugging duties, particularly when the administrators are debugging chipset issues of a cloud node. For instance, because cloud datacenters are often located in remote areas, it is often difficult to properly diagnose and debug a node that is located in the cloud datacenter. Indeed the debugging process can take months to complete. By following the principles disclosed herein, a system administrator is provided with an advanced toolset and knowledge, which toolset and knowledge greatly benefits the administrator in quickly and efficiently deducing a chipset-specific problem and resolving that problem. Additionally, the disclosed embodiments provide for a system that is able to identify and resolve chipset problems on its own. As a result, the disclosed embodiments greatly advance the debugging process because less interaction and instruction are required from the system administrator.

The present embodiments also improve the underlying functionality of a computer system. For instance, the disclosed embodiments are primarily practiced in situations where a computer system's chipset is not operating in a desired manner. By following the principles disclosed herein, any errors and other problems that are causing the chipset to operate inefficiently may be discovered quickly and may be resolved in an efficient manner. As a result, the disclosed embodiments significantly improve how a computer system operates because they help resolve complex issues that are preventing the computer system's chipset from operating more efficiently.

To achieve these benefits (and others), the disclosed embodiments initialize a system management mode (SMM) environment in a basic input/output system (BIOS) setting of a computer system. Here, there is a debug agent located within the SMM environment. This debug agent receives an instruction indicative of a chipset-specific health-related issue of the computer system. Based on this instruction, the debug agent executes a script entry by fetching health-related information about the computer system's chipset. This health-related information includes health-related metadata or counter information about the computer system. Next, the debug agent records the health-related information. Subsequently, the debug agent obtains a resolution for the health-related issue. Here, this resolution is based at least partially on the received information.

Having just described various high-level features and benefits of the disclosed embodiments, the disclosure will now turn to FIG. 1, which presents an introductory discussion of an example computer system. Following that discussion, various architectures and supporting illustrations will be provided to give context on how a cloud data center operates. These architectures and supporting illustrations are presented in FIGS. 2 through 8. Following that disclosure, a new debug agent will be discussed in relation to FIGS. 9 through 14. The remaining figures (FIGS. 15-17) discuss various architectures and methods for practicing the disclosed embodiments.

Example Computer System

As illustrated in FIG. 1, in its most basic configuration, a computer system 100 includes various different components. For example, FIG. 1 shows that computer system 100 includes at least one hardware processing unit 105, a graphics processing unit (GPU) 110, input/output (I/O) interfaces 115, graphics rendering engines 120, storage 125, and one or more sensors 130.

The storage 125 may be physical system memory, which may be volatile, non-volatile, or some combination of the two. The term "memory" may also be used herein to refer to non-volatile mass storage such as physical storage media. If the computing system 100 is distributed, the processing, memory, and/or storage capability may be distributed as well. As used herein, the term "executable module," "executable component," or even "component" can refer to software objects, routines, or methods that may be executed on the computing system 100. The different components, modules, engines, and services described herein may be implemented as objects or processors that execute on the computing system 100 (e.g. as separate threads).

The disclosed embodiments may comprise or utilize a special-purpose or general-purpose computer including computer hardware, such as, for example, one or more processors (such as processor 105) and system memory (such as storage 125), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors 140 (e.g., debugging tools.). Further, the computer system 100 may also be connected through one or more wired or wireless networks 135 to remote systems(s) that are configured to perform any of the processing described with regard to computer system 100.

The graphics rendering engine 115 is configured, with the processor(s) 105 and the GPU 110, to render one or more objects on a user interface.

A "network," like the network 135 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 135. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As discussed above, computer systems are able to provide a broad variety of different functions. One such function includes performing debugging operations. Accordingly, attention will now be directed to FIGS. 2 through 8, which figures provide a background for the debugging processes performed by the disclosed embodiments.

Computing Processes

Figure 2:
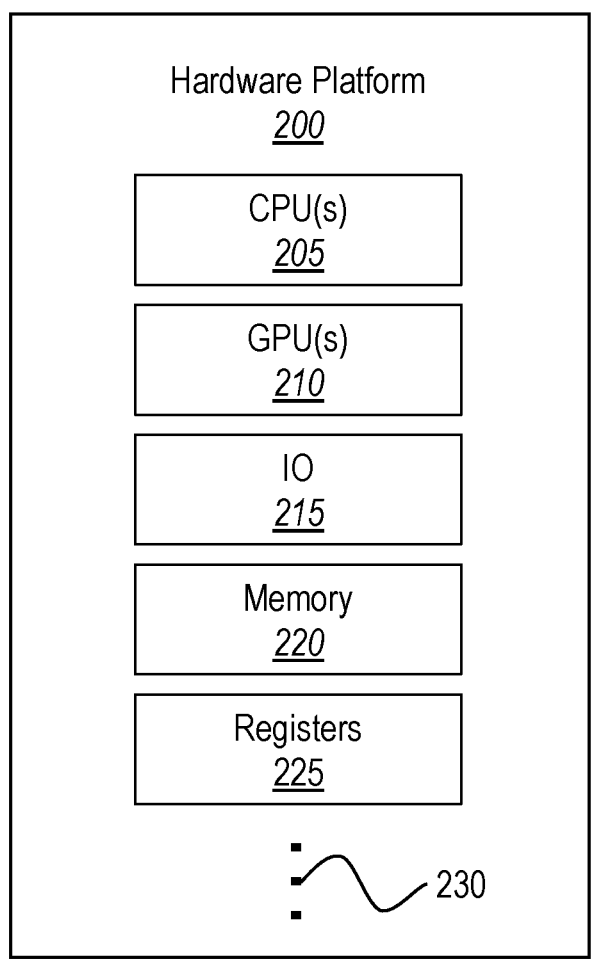
FIG. 2 describes a hardware platform of a computer system.

As discussed earlier, a computer system (e.g., the computer system 100 of FIG. 1) includes various hardware components that enable it to perform in a desired manner. FIG. 2 illustrates additional details with regard to some of those hardware components. Collectively, the hardware components can be identified as a computer system's hardware platform 200. Here, the hardware platform 200 includes CPU(s) 205, GPU(s) 210, input/output (IO) devices 215, memory (220), and registers 225. The ellipses 230 demonstrates that the hardware platform 200 may include additional hardware components. Accordingly, the depiction illustrated in FIG. 2 is for example purposes only and should not be considered as limiting. It will be appreciated that a computer system (e.g., the computer system 100 of FIG. 1) includes the hardware platform 200. Further, there are many different types of computer systems (e.g., desktops, laptops, servers, etc.). Here, it is worthwhile to note that a chipset is essentially a controller that manages the interactions and communications that occur across the computer system's hardware platform (e.g., the motherboard). In particular, the chipset manages the compatibility between all of the components on the motherboard. For example, the chipset ensures that the CPU is compatible with the RAM, the hard drives, the GPU(s), the graphics engines, etc. In this manner, the chipset helps control the communications that occur in the hardware platform 200.

Figure 3:
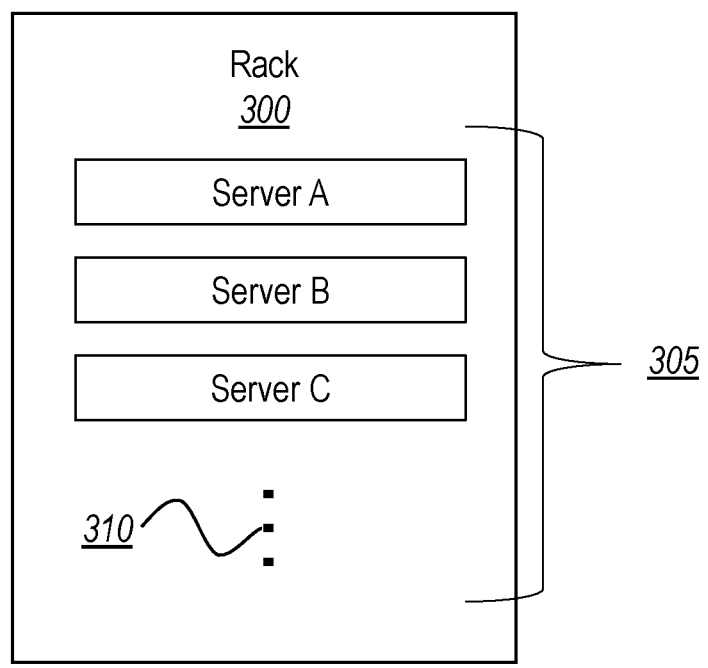
FIG. 3 provides background on a cloud datacenter.

FIG. 3 shows a server rack 300 that includes a plurality of servers 305. For instance, the server rack 300 includes Server A, Server B, and Server C. The ellipses 310 illustrates that the server rack 300 may include any number of servers. When a group of servers (e.g., the plurality of servers 305) are organized in this manner, then the group provides a powerful data processing center.

Figure 4:
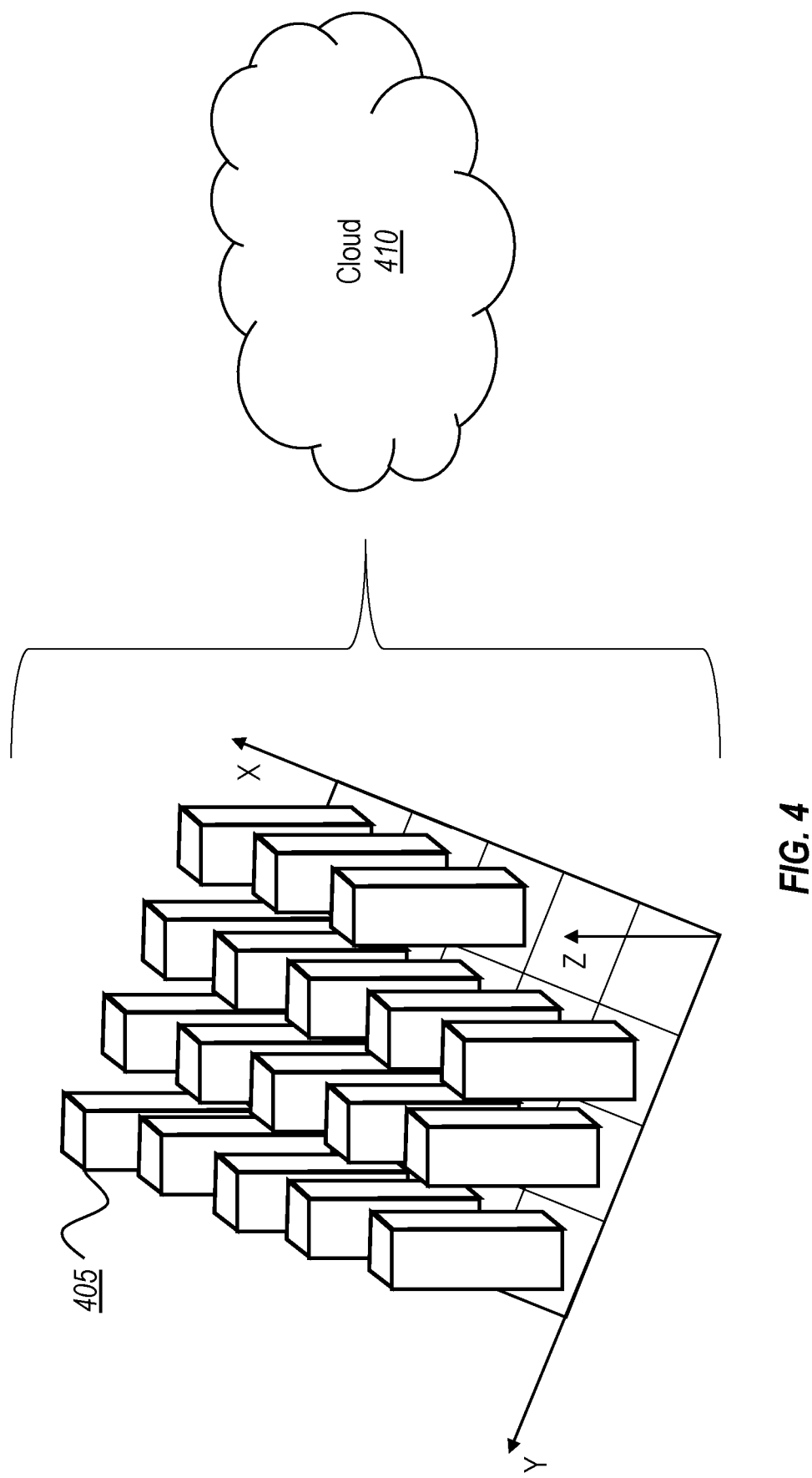
FIG. 4 provides background on a cloud datacenter.

FIG. 4 illustrates a collection of server racks (e.g., server rack 405 which is analogous to the server rack 300 of FIG. 3). Such a collection of server racks constitutes a data center. As is generally known, the cloud (e.g., cloud 410 in FIG. 4) is simply a large collection of server racks. For instance, the cloud may be comprised of many thousands of server racks, where each rack includes many servers (aka nodes). As whole, a cloud datacenter provides an enormous amount of computing power.

Figure 5:
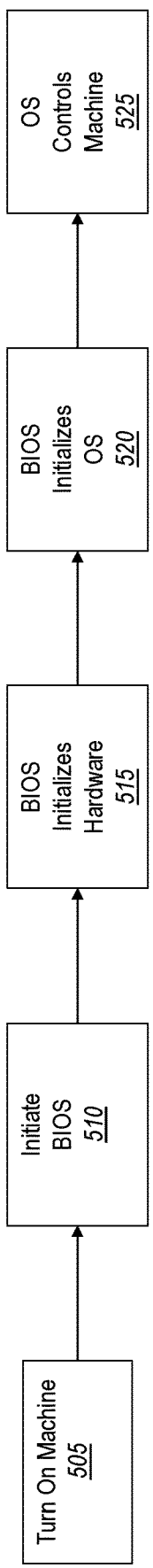
FIG. 5 describes how a computing node normally boots up.

Having just described a high-level overview of the cloud, attention will now be directed to FIG. 5. In particular, FIG. 5 illustrates a traditional bootup process for a computer system (e.g., a server).

Initially, the computer system is turned on (step 505). After the computer system is turned on, the BIOS is initiated (step 510). The BIOS is a type of firmware stored in read-only memory. Of note, the BIOS is the first sequence of instructions that executes when the computer is turned on.

At a high-level, the BIOS is configured to "wake up," or rather initialize, the various hardware components (step 515). For instance, the BIOS is configured to inform each of the hardware components in the hardware platform (e.g., the hardware platform 200 of FIG. 2) what it is and what it is capable of performing. In this manner, the BIOS initializes the hardware components.

Next, the BIOS initializes the operating system (OS) (step 520). The OS is stored in non-volatile memory. As a result, the OS persists even when the computer system is turned off. As is commonly known, however, disk reads and writes are significantly slower than RAM memory reads and writes. Therefore, as a part of initializing the OS, a copy of the OS is loaded from disk into RAM. By so doing, the computer system will be able to run the OS much faster than if the OS were to remain only on the disk.

Once the OS is operational, then the BIOS relinquishes control, and the OS assumes control of the machine (step 525). In this manner, the BIOS plays a significant role in initializing a computer system.

Figure 6:
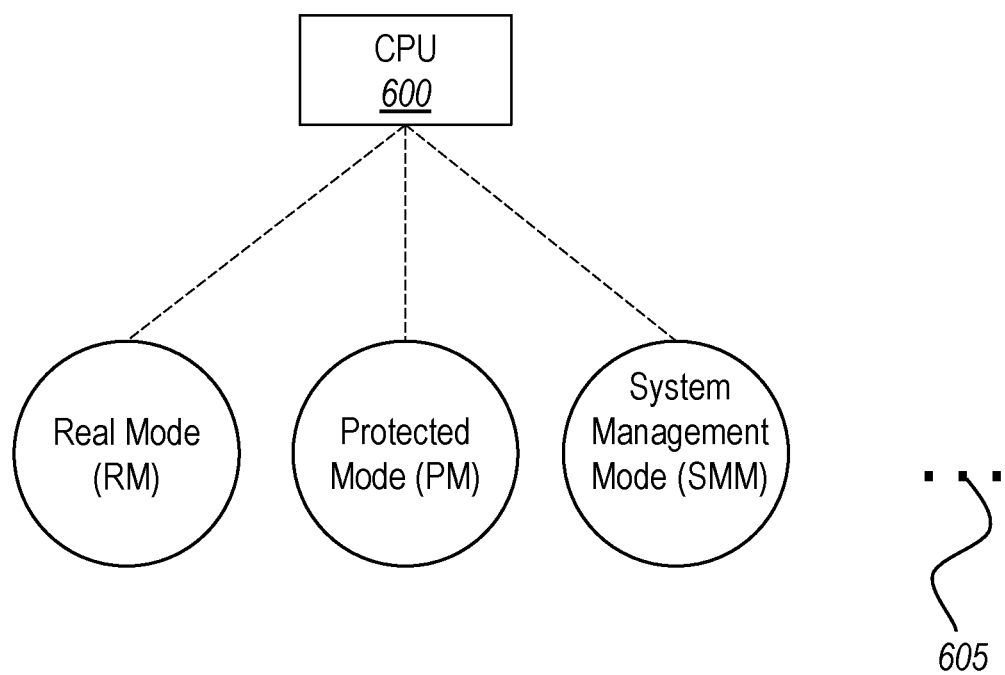

To perform all of these processes, a computer system uses a central processing unit (CPU). The CPU is essentially the "brain" of the computer system in that it is the entity that performs the computations and processes which enable the computer to operate as it should. As shown in FIG. 6, the CPU 600 may operate using various different modes. For instance, the CPU 600 may operate in a real mode (RM), a protected mode (PM) or a system management mode (SMM). The ellipses 605 demonstrates that the CPU 600 may operate in other modes as well. The remaining portion of this disclosure will focus on scenarios in which the CPU operates in SMM. By way of a brief introduction, the SMM is a highly privileged mode that enables a system administrator to work with the platform specific features and chipset specific features of the underlying computer system.

Figure 7:
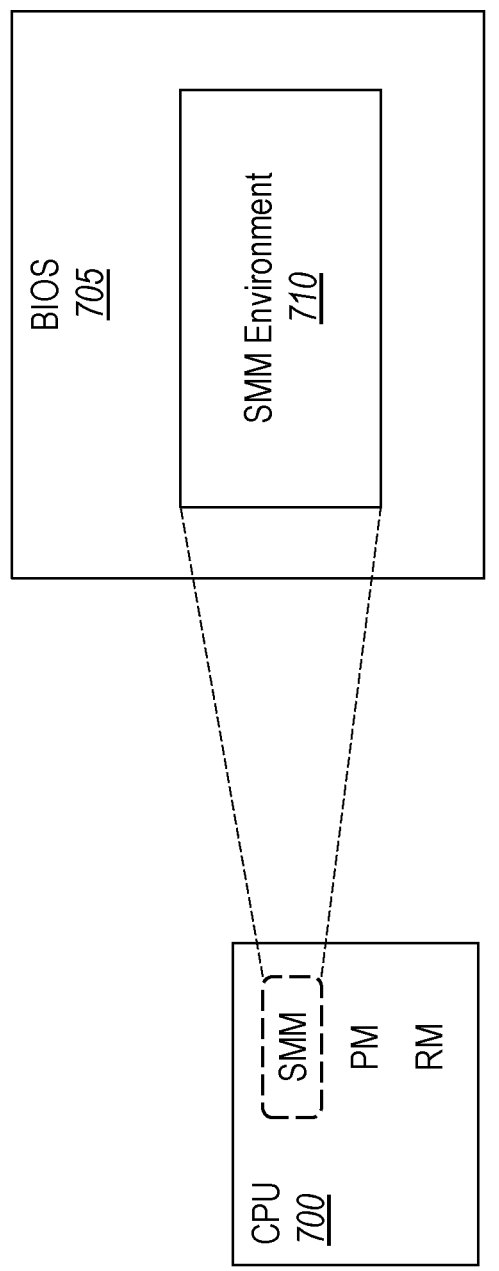
FIG. 7 describes an example SMM environment.

As shown in FIG. 7, when the CPU 700 operates in SMM, then the BIOS 705 will create a SMM environment 710. As discussed, the SMM is a type of operational mode that allows for low-level system management operations to be performed. Of note, a computer system does not normally operate in SMM. Instead, the SMM is a specialized mode and is reserved for performing specialized, low-level operations.

Figure 8:
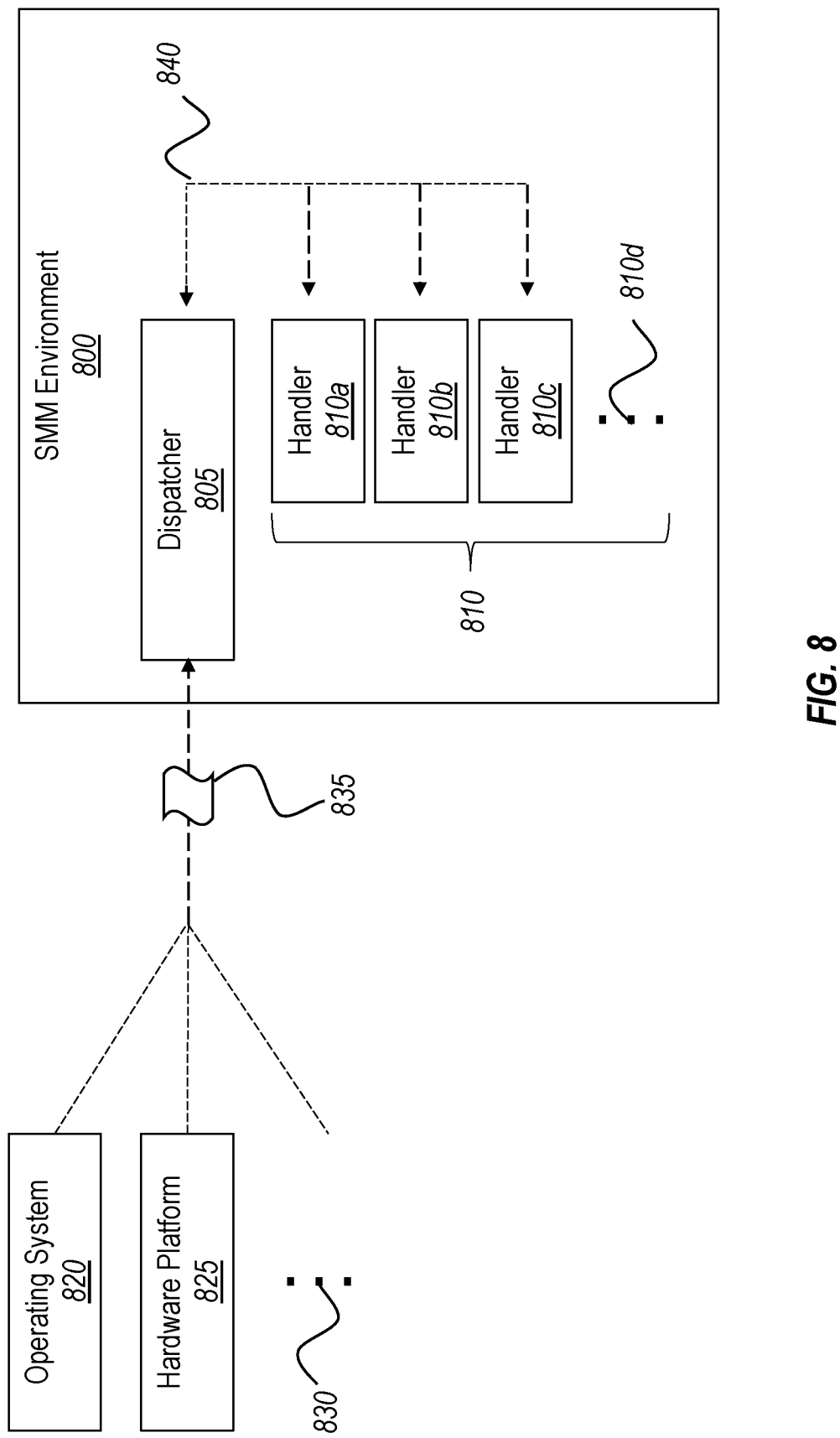
FIG. 8 provides an introductory discussion on system management interrupts and system management handlers.

FIG. 8 illustrates some of the example features that are available when a CPU is in the SMM. Here, the SMM environment 800, which is analogous to the SMM environment 710 of FIG. 7, is shown as including a dispatcher 805 and a plurality of handlers 810. For instance, there is a handler 810a, a handler 810b, and a handler 810c. The ellipses 810d demonstrates that there may be any number of handlers in the SMM environment 800.

In order to cause a CPU to transition from a different mode into the SMM, a system management interrupt (SMI) will be issued. In some cases, an SMI will originate from the operating system 820 while in other cases the SMI can originate from a hardware component within the hardware platform 825. Notably, the ellipses 830 demonstrates that a SMI may be issued from other areas as well. Accordingly, the depiction shown in FIG. 8 is for example purposes only and should not be considered limiting.

Regardless of which entity issues the SMI, the SMI (e.g., SMI 835) will be delivered to the SMM environment 800. Here, the role of the dispatcher 805 is to receive the SMI 835 and then transfer (840) it to the plurality of handlers 810. In some instances, a single handler will process the SMI 835 while in other instances multiple handlers will process the SMI 835. Accordingly, FIG. 8 shows an example of a SMM environment 800.

Here, it is worthwhile to note that the SMM environment provides an avenue for processing runtime situations. Stated differently, the SMM environment is a type of environment where platform specific errors or chipset specific errors may be analyzed and dealt with. Although operating systems are quite robust, a computer's OS does not include error handlers for every type of chipset. To reiterate, a majority of OSs do not include many chipset-specific features or error handlers. Instead, the OS is configured to communicate with the general core and the general interfaces for making the CPU features available. Therefore, in order to debug the chipset-specific features, system administrators cause the CPU to transition into SMM. Additionally, traditional methods of debugging chipset-specific features required a system administrator to plug in a debugging device (e.g., a JTAG debugger) into the computer system. According to the principles disclosed herein, however, a system administrator no longer needs to be physically present to debug chipset-specific and platform-specific errors.

To summarize the above discussion, the SMM environment provides an environment where any chipset-specific problems may be dealt with. A practical example of a chipset-specific problem is when a particular zone in the motherboard becomes too hot. In this example scenario, a fan can be turned on to cool that particular zone.

Debug Agent

Figure 9:
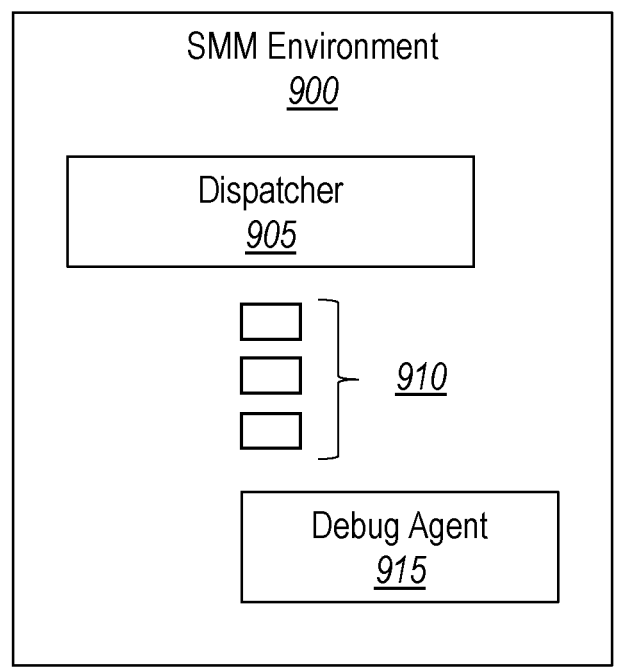
FIG. 9 illustrates an example architecture for a debug agent in a SMM environment.

Having just introduced a SMM environment, attention will now be directed to FIG. 9, which illustrates an example architecture in which the disclosed embodiments may be realized. Similar to the architecture presented in FIG. 8, the SMM environment 900 of FIG. 9 includes a dispatcher 905 and a plurality of handlers 910. In addition to those components, the disclosed embodiments instantiate a debug agent 915 within the SMM environment 900. This debug agent 915 is a specialized type of handler and is used to understand the chipset and platform health of the computer system. As discussed earlier, system administrators are often not able to be physically present when debugging a node in the cloud. As a result, traditional debugging methods (e.g., attaching a JTAG debugger to a computer system) are not available for nodes in a cloud. Accordingly, the debug agent 915 enables a system administrator to remotely debug a cloud node.

Figure 10:
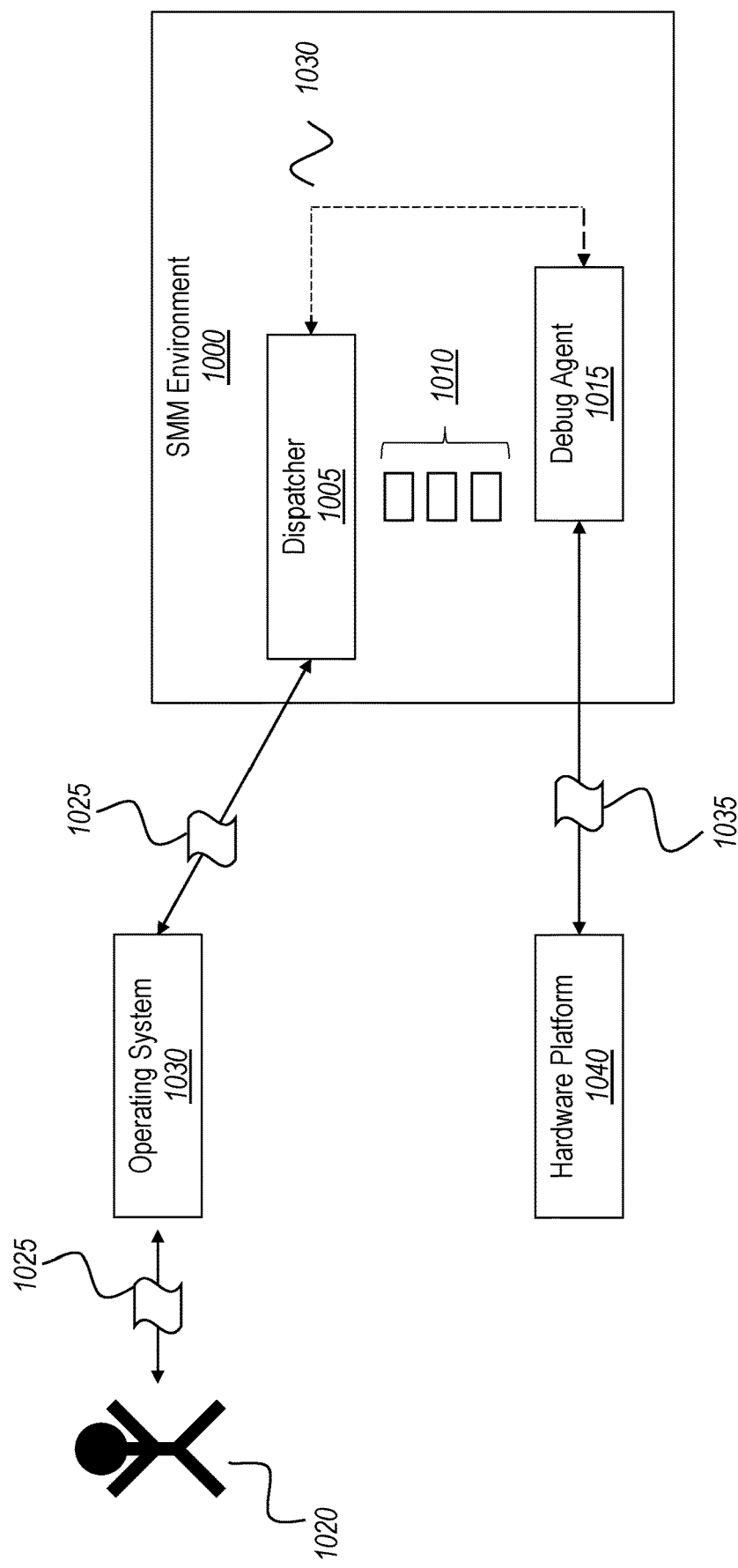
FIG. 10 shows an example architecture in which a debug agent is able to determine the health of a computer system.

FIG. 10 illustrates some of the operations that a debug agent can perform. Initially, FIG. 10 shows a SMM environment 1000. Similar to the earlier disclosure, this SMM environment 1000 includes a dispatcher 1005 and a plurality of handlers 1010. Additionally, this SMM environment 1000 includes a debug agent 1015, which is analogous to the debug agent 915 of FIG. 9.

Although a system administrator (e.g., the system administrator 1020, also hereinafter also referred to as simply an "administrator") will likely be physically located remotely from a node in the cloud, the administrator 1020 will still be able to receive reports concerning the general status of the nodes in the datacenter. By examining these reports, the system administrator 1020 will be able to deduce that a particular node is not operating as efficiently as it could be. According to the principles disclosed herein, the system administrator 1020 is able to generate a SMI 1025 and then cause the operating system 1030 (of the problem node) to process that SMI 1025. By processing the SMI 1025, the problem node's CPU will transition into the system management mode (SMM). Therefore, as a result of the SMI 1025 being processed, the SMM environment 1000 will be initialized and made available for use by the system administrator 1020.

This SMI 1025 will initially be delivered to the dispatcher 1005. The role of the dispatcher 1005 is to transmit the SMI 1025 to the plurality of handlers 1010 as well as to the debug agent 1015 (step 1030). In this manner, the SMI 1025 acts as an indication that the debug agent 1015 is to perform certain actions. For example, unlike standard SMI handlers (e.g., the plurality of handlers 1010), the debug agent 1015 is structured to be able to process scripts (also hereinafter also referred to as script entries).

At this point, the disclosure will now focus on the various different scripting methods that are provided by the disclosed embodiments. By way of a brief introduction, a script can be used to immediately resolve a known health-related problem. In other circumstances, however, the health-related problem may not be fully known or understood. In these circumstances, a script can be used to identify the health-related problem. After understanding the problem, then another script can be executed in order to resolve that problem.

Having just briefly introduced some of the scenarios in which a script may be used, a detailed disclosure will now be presented for each of those scenarios. The scenario in which a health-related problem may be immediately resolved will be discussed first.

In this circumstance, the system administrator 1020 becomes aware of a health-related issue that is impacting a cloud node. For example, the system administrator 1020 may receive a generalized health report indicating that one of the nodes is not operating as desired. Based on the system administrator 1020's experience, the system administrator 1020 may immediately know or at least have a good estimate of what is causing the problem (e.g., perhaps this is a repeated problem). To clarify, in this example scenario, the system administrator 1020 may have specific knowledge regarding what the issue is. In light of this specific knowledge, the disclosed embodiments enable the system administrator 1020 to write a custom script that is to be executed by the debug agent 1015 in order to resolve the health-related issue. As used herein, it will be appreciated that the "health-related problems" include chipset-specific and platform-specific problems.

In some embodiments, this custom script is initially stored in memory. When the system administrator 1020 issues a SMI (e.g., SMI 1025), the SMI will include a pointer (or indication) to a port where the custom script is located as a package and which port is accessible by the debug agent 1015. In other words, the SMI identifies the port. In this manner, the debug agent 1015 is able to access the package (i.e. the custom script) via the port. Here, it is worthwhile to briefly note that the debug agent 1015 is also able to authenticate the package (i.e. the custom script) to ensure that it is not malicious. In this manner, the debug agent 1015 can authenticate any type of received instruction prior to executing a script entry. Additional details on the authentication process will be presented later. Accordingly, in these scenarios, the debug agent 1015 is able to access the custom script via a port.

In a different embodiment, however, the custom script may be included as a part of the SMI itself. Here, the debug agent 1015 is able to access the custom script directly from the instruction (i.e. the SMI) without having to go through a port. Accordingly, in the example scenario in which the system administrator 1020 has specific knowledge of a health-related issue, some of the embodiments enable the system administrator 1020 to generate a custom script in order to resolve those issues.

For example, suppose that the system administrator 1020 learns that a particular node's platform or chipset is malfunctioning or experiencing problems. In this example scenario, the system administrator 1020 knows that the reason the node keeps failing is because a particular zone on the node's motherboard keeps overheating. In light of this knowledge, the embodiments enable the system administrator 1020 to generate a custom script to be executed by the debug agent 1015 to resolve the overheating issue. For instance, the custom script can direct the debug agent 1015 to turn on a fan for a longer period of time or to turn on the fan more frequently than its current turn on frequency. In this manner, the overheating issue can be resolved. As can be seen from this disclosure, the embodiments are able to receive a custom script and execute that script in order to resolve a health-related issue.

The disclosure presented above focused on an example scenario in which the system administrator 1020 had specialized knowledge concerning the source of a health-related issue. In many instances, however, the system administrator 1020 will not have this specific knowledge. Instead, the system administrator 1020 will simply have high-level knowledge that a problem exists in one of the nodes. When such a scenario occurs the disclosed embodiments provide multiple pathways forward. Accordingly, those multiple options/pathways will now be discussed.

In a first option in which the health-related problem is not specifically known or understood, a script can be used to delineate an experiment that is to be performed by the computer system while the CPU is in SMM. Here, this experiment is structured to determine a health status of the computer system. Stated differently, the experiment describes various different health-related information that the computer system is tasked with fetching.

Figure 11:
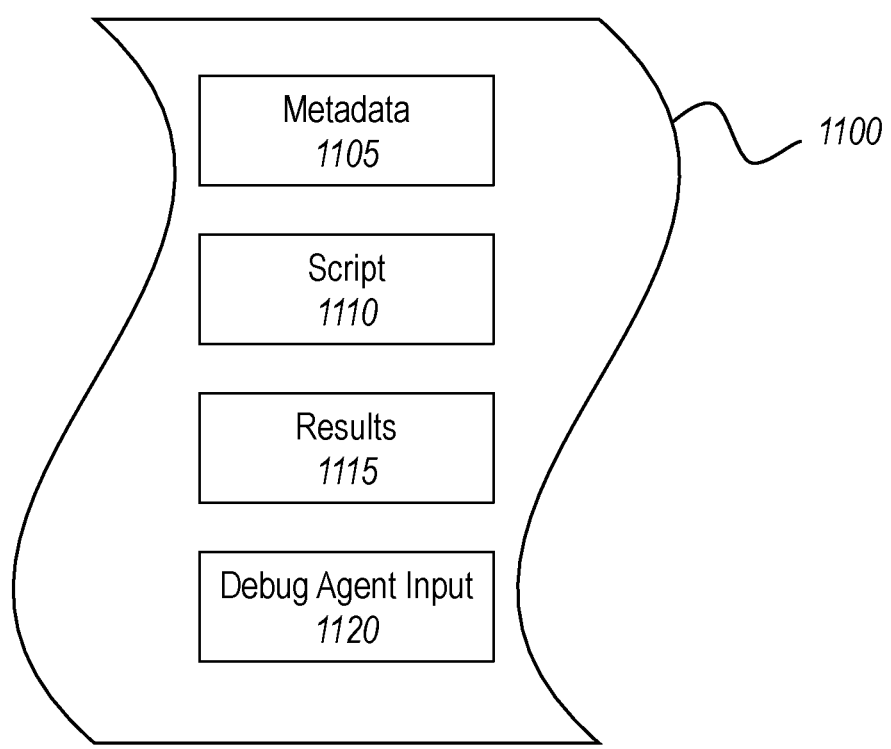
FIG. 11 illustrates an example of some of the parameters that may be included in a script entry.

Turning briefly to FIG. 11, FIG. 11 illustrates an example script entry 1100. As shown, the script entry 1100 includes a metadata section 1105, a script section 1110, a results section 1115, and a debug agent input section 1120. Here, the metadata section 1105 may be used to describe a scope of the experiment. For instance, it can describe the basic characteristics of the experiment such as, for example, how long the experiment is to run, how frequently the experiment is to run, how much data should be collected, what hardware components are to be queried, and even a priority level (i.e. an importance level) of the experiment. The script section 1110 may be used to describe what information will be polled/fetched from the hardware components. In other words, the script section 1110 defines the logic that is to be executed so as to perform the experiment. The results section 1115 is a section where the results of the experiment may be stored. For instance, while the debug agent 1015 is performing the experiment, a plethora of information may be returned. Here, this information may be stored in the results section 1115. The debug agent input section 1120 will be discussed later.

In some instances, the debug agent 1015 will filter through the results prior to storing it in the results section 1115 while in other instances all of the data is placed in the results section 1115 and potentially returned to the system administrator 1020. When the debug agent 1015 filters the results, the debug agent 1015 is able to examine the data and determine which data may be relevant to identifying a chipset-specific/platform-specific health-related issue and which data is not relevant to a health-related issue. In this manner, the debug agent 1015 is able to examine the data is an intelligent manner and filter out any irrelevant data that will not be useful in identifying a problem. By way of example, the debug agent 1015 can compare the data to historical data and determine if some data points exceed an acceptable threshold or historical value. If the data points exceed that threshold value, then this may be an indication that a corresponding hardware component is failing in some manner. If, however, the data point is within historical norms, then the debug agent 1015 is able to determine that the data point is not relevant in identifying a health-related issue.

Returning to FIG. 10, the debug agent 1015 is able to process the experiment script and fetch (1035) information from the various components included within the hardware platform 1040. In this manner, the debug agent 1015 can query one or more (or all) of the hardware components (or any addressable platform endpoint) in an effort to learn what is the source of the platform problem. For instance, the debug agent 1015 can query the hardware platform endpoints (e.g., the CPU, the memory, the IO, or any other addressable endpoint.). Additionally, the debug agent 1015 can fetch health-related information from a set of standard interfaces (e.g., a CPMSR, a VCI, or a CSR). In some instances, this fetching process includes fetching various different opcodes or protocols that are associated with the computer system. By fetching the service opcodes, the debug agent 1015 is able to learn of the system's state and its health indicators. In some instances, fetching health-related information includes obtaining metadata that describes a health status of the computer system. Once the information is fetched (1035) from the hardware platform 1040, then the debug agent 1015 is able to filter through that information to identify a health-related issue (e.g., perhaps a zone on the motherboard is overheating). Once the experiment is performed (i.e. once information is retrieved and the health-related issue is identified by the debug agent 1015), then both the computer system and the system administrator 1025 will have a better understanding of the issues that the computer system is currently facing and a resolution can be implemented.

Here, it will be appreciated that this experimental script can be generated in a variety of ways. Accordingly, these ways will now be discussed in detail. In a first manner, the system administrator 1020 is able to generate the experimental script and delineate the information that he/she would like the debug agent 1015 to fetch. As a result, the system administrator 1020 can play a large role in managing the experiment that is to be performed by the debug agent 1015.

In a second manner, the debug agent 1015 can operate in an "auto mode." Here, the system administrator 1020 simply submits an indication, or rather a "hint," to the debug agent 1015 (perhaps via the SMI). This indication informs the debug agent 1015 that there is a problem with the computer system and that the system administrator 1020 would like the debug agent 1015 to find out what the problem is and attempt to resolve that problem if possible.

To that end, the debug agent 1015 is able to query a database of previously generated script entries and select one or more script entries that the debug agent 1015 determines may be relevant to the hint identified by the indication. Stated differently, the debug agent 1015 has an associated library of pre-generated scripts. In this manner, the debug agent 1015 is able to select one or more scripts from that library/database in order to perform an experiment to learn of a specific problem. Of note, the debug agent 1015 selects one or more of the script entries based on the received instruction. Consequently, the debug agent 1015 acts in an auto mode because it (as opposed to the system administrator 1020) determines which script entries to execute. At this point, it is worthwhile to note that the database/library of previously generated scripts may be located remotely from the computer system and the debug agent. Further, the database may be accessible by other computer systems and debug agents in the datacenter. In this manner, there may be a datacenter-wide database of previously generated scripts which are accessible by any debug agent. Further, any debug agent is able to submit new scripts into the database. As a result, the database may act as a large, comprehensive storage area for maintaining experiment scripts and resolution scripts. In this manner, a collective knowledge of the datacenter as a whole may be maintained.

Here, it is worthwhile to note that the library of previously generated script entries may include scripts that (1) were previously generated by the system administrator 1020 and then later saved by the debug agent 1015, (2) were included within an initial configuration package when the debug agent 1015 was initially installed on the computer system, or (3) were previously generated by the debug agent 1015 itself using its own computer learning algorithms (i.e. the scripts are machine-generated scripts).

In this manner, the debug agent 1015 essentially designs the experiment that is to be performed in order to deduce what the health-related problem is. After the debug agent 1015 selects one or more scripts, the debug agent 1015 then executes those scripts and collects any resulting information. As discussed earlier, the debug agent 1015 is able to filter through the results and determine which results are indicative of a problem.

While in this auto mode, the debug agent 1015 is also able to execute one or more resolution scripts that are designed to resolve the identified problem. Similar to the experiment scripts that were stored in the library/database, resolution scripts may also be stored in the library. Relatedly, these resolution scripts may be scripts previously generated by the system administrator 1020 and then stored for later use, or they may be scripts that were included within an initial configuration setup, or they may be scripts that the debug agent 1015 previously designed itself. In this manner, the debug agent 1015 is able to design an experiment, run the experiment, comb through the results of the experiment, and then perform subsequent actions based on the results of the experiment.

Accordingly, the debug agent 1015 includes an auto mode, which is a mode where the debug agent 1015 can act independently to design and execute an experiment. Further, the debug agent 1015 is able to independently determine a resolution for an identified health-related issue. In this manner, the debug agent 1015 can also independently apply the resolution in an attempt to fix the health-related issue. Here, the debug agent 1015 is able to perform these operations without any additional input from the system administrator 1020. While the foregoing disclosure presented a scenario where the debug agent selected a previously generated script, it will also be appreciated that the debug agent is able to dynamically create a script as needed. To clarify, in response to receiving a hint from the system administrator, the debug agent is able to dynamically (i.e. in real time) create a script of its own in order to conduct an experiment. Furthermore, the debug agent can use a combination of an existing script as well as a dynamically created script in order to conduct the experiment (i.e. it can use multiple scripts to conduct the experiment).

In a third circumstance, the debug agent is able to expand upon an experiment that is designed by the system administrator. In other words, this third circumstance is essentially a hybrid of the first circumstance (where the system administrator designed the experiment by writing a custom script) and the second circumstance (where the debug agent intelligently designed the experiment by either selecting one or more previously generated scripts or by dynamically developing a script itself).

For example, suppose the system administrator designs an experiment in which he/she generated a custom script. Here, the debug agent is able to analyze the experiment and identify (or dynamically create) one or more additional scripts that the debug agent determines may also be relevant based on its understanding of the administrator's designed experiment. In this manner, the debug agent is able to execute the administrator's experiment as well as its own experiment. Turning briefly to FIG. 11, the debug agent may then store the results of the administrator's experiment in the results section 1115, and it may store the results of its own experiment in the debug agent input section 1120. These results can then be returned to the system administrator along with a set of potential resolutions that the debug agent created in response to analyzing those results.

Figure 12:
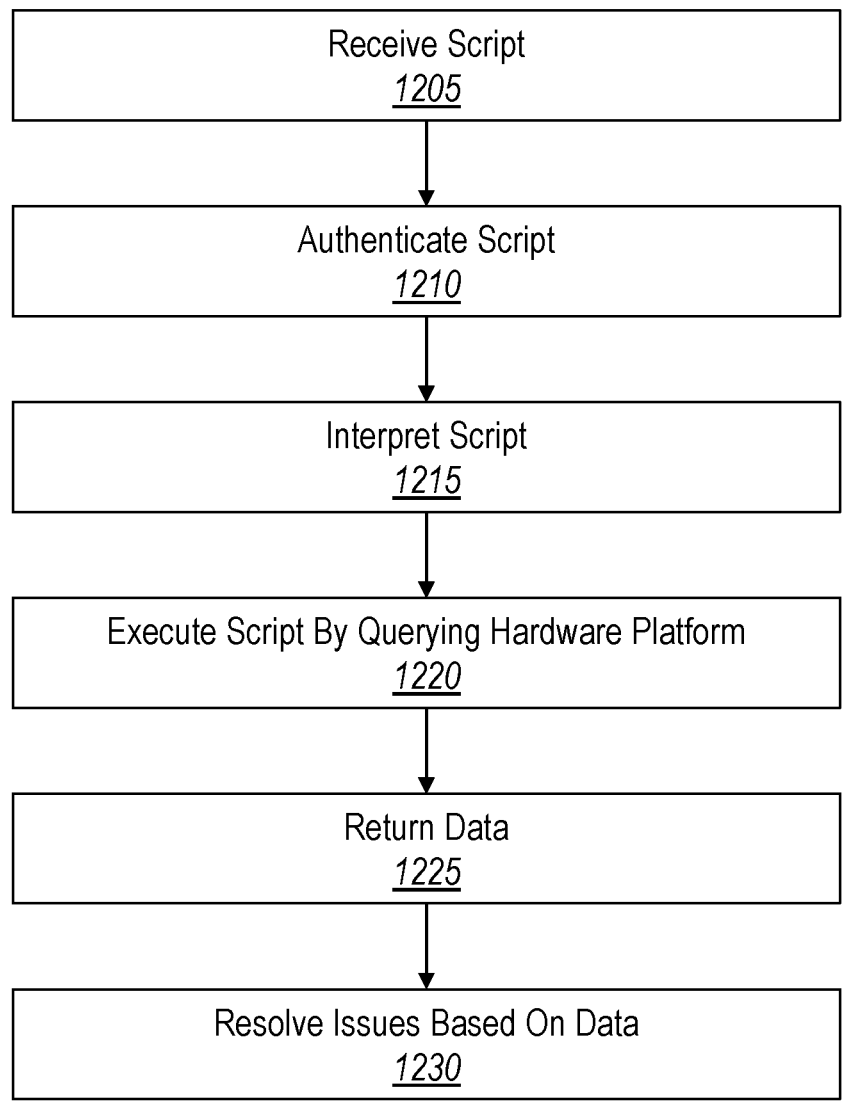
FIG. 12 provides a high-level flowchart of some of the operations that may be performed by a debug agent.

Having just described how the debug agent 1015 is able to use a script entry to identify and resolve a health-related issue, attention will now be directed to FIG. 12 which illustrates a high-level flowchart of these processes.

Figure 13:
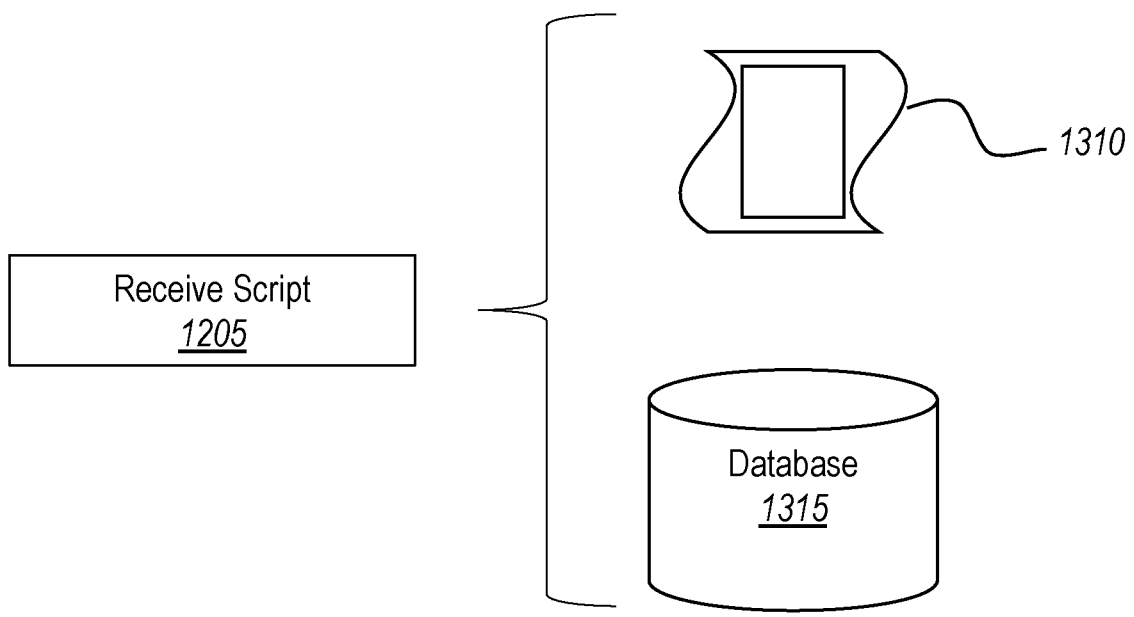
FIG. 13 illustrates various attributes of a script entry.

Here, the debug agent receives a script (step 1205). FIG. 13 shows that the process of receiving the script 1205 can be performed in a variety of ways, as described earlier. For instance, FIG. 13 shows that the script may be a custom generated script 1310 received from a system administrator. Alternatively, the script may be selected from a database 1315 that maintains a plethora of previously generated scripts. Additionally, the debug agent is able to dynamically (i.e. in real time) create a script using its machine learning (e.g., see the machine learning component 1620 of FIG. 16).

Returning to FIG. 12, once the script is received, then the debug agent is able to authenticate the script (step 1210). As discussed earlier, the debug agent is able to receive the script from various different sources. For instance, the script may be stored as a package with an associated port, or the script may be included within a SMI, or the script may be stored in a database that is associated with the debug agent. In some circumstances, the debug agent will verify, or rather, authenticate the source of the script.

In some circumstances, the script will be signed using a signature that has an associated private key, where the signature is attached to the tail end of the script. Here, the debug agent is able to challenge this signature to verify that the signature is authentic. As an example, a public key is already stored as a part of the BIOS and is in the SMM environment. In some embodiments, this public key is used to challenge the signature by measuring the contents of the script. If the challenge is successful, then the debug agent knows that the script is from a reliable source. If, however, the challenge fails, then the debug agent can disregard the script entry. To summarize, the debug agent is able to authenticate a received instruction (e.g., a script) by (1) determining a signature associated with the received instruction and (2) challenging the signature to determine whether the signature is associated with a valid private key. Accordingly, the disclosed embodiments provide an authentication process to ensure that the debug agent will not execute an unsafe/malicious script entry.

Continuing, the debug agent will then interpret the script (step 1215). In this manner, the debug agent may include an interpreter that is structured to interpret a sequence of instructions included within the script entry.

Next, the debug agent is able to execute the script by querying the hardware platform (step 1220). As discussed, the debug agent is able to fetch chipset-specific and platform-specific health-related information in an attempt to identify a specific health issue.

Figure 14:
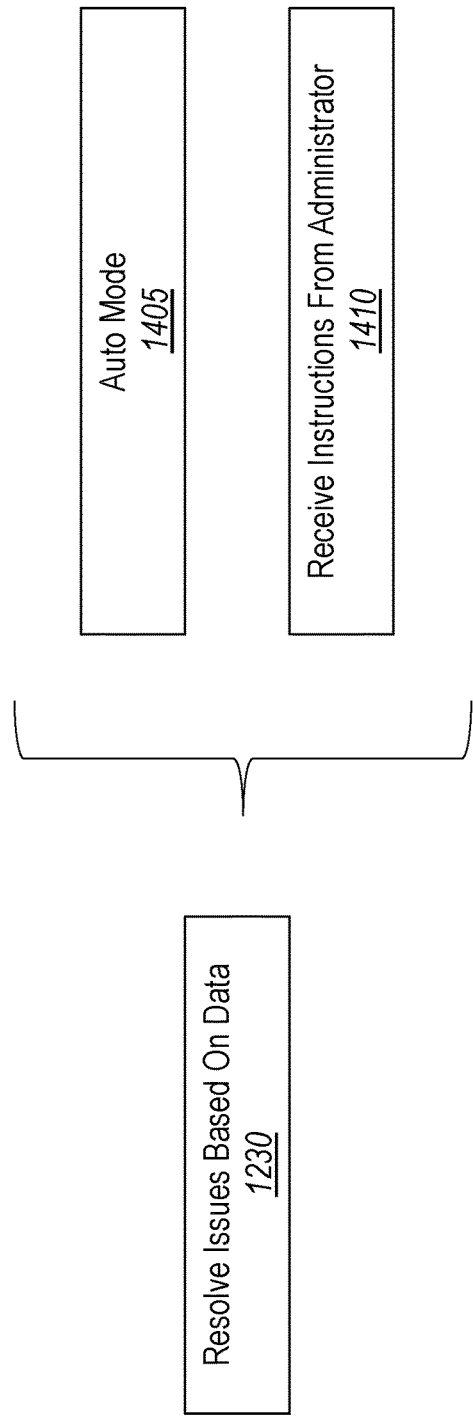
FIG. 14 illustrates various processes that a debug agent can follow to resolve a chipset-specific health-related issue.

The results of executing the script are then returned to the debug agent (step 1225). In some instances, the debug agent will process the result to identify a resolution while in other circumstances the system administrator will receive the results and generate a resolution. Regardless of which entity generates the resolution, a resolution will be executed in an attempt to resolve the issue (step 1230). Here, this resolution is based on the returned results. As discussed above, the system administrator may play a large role in these processes. Alternatively, the debug agent can operate in an auto mode and perform many of these operations by itself using its own intelligence. Turning briefly to FIG. 14, FIG. 14 shows that the debug agent can operate in an auto mode 1405 to identify and resolve the issues. Alternatively, the debug agent is able to receive resolution instructions from the system administrator (1410).

Having just discussed many of the principles of the disclosed embodiments, attention will now be directed to the remaining figures which illustrate various example computer system architectures and methods for implementing the disclosed principles.

Figure 15:
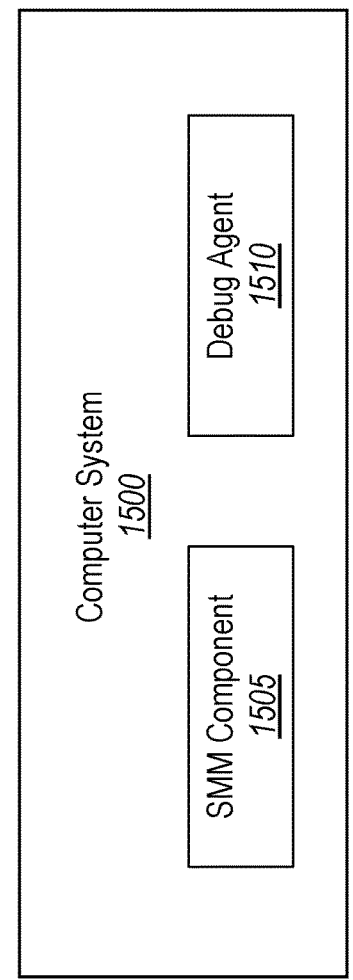
FIG. 15 illustrates an example computer system that may be used to practice the disclosed principles.
Figure 16:
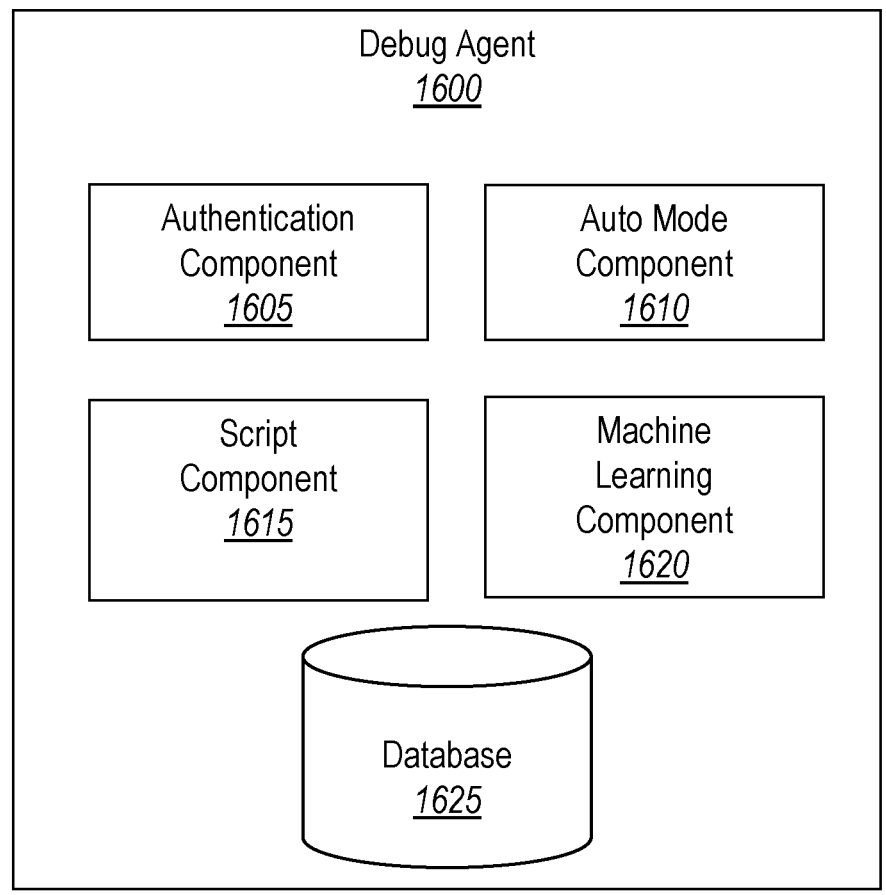
FIG. 16 illustrates an example architecture of a debug agent.

Turning first to FIG. 15, FIG. 15 shows an example computer system 1500 that includes a SMM component 1505 and a debug agent 1510. Relatedly, FIG. 16 shows a debug agent 1600 (which is analogous to the debug agent 1510 as well as the other debug agents mentioned herein). This debug agent 1600 includes an authentication component 1605, an auto mode component 1610, a script component 1615, and a machine learning component 1620. The debug agent 1600 also has an associated database 1625. Accordingly, this architecture may be used to implement the principles disclosed herein. Additional details on these components will be discussed below in relation to an example method.

Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The methods are implemented by one or more processors of a computer system (e.g., the computer system 100 of FIG. 1). It will be appreciated that a computer system includes one or more computer-readable hardware storage media that stores computer-executable code. This computer-executable code is executable by the one or more processors to cause the computer system to perform these methods.

Figure 17:
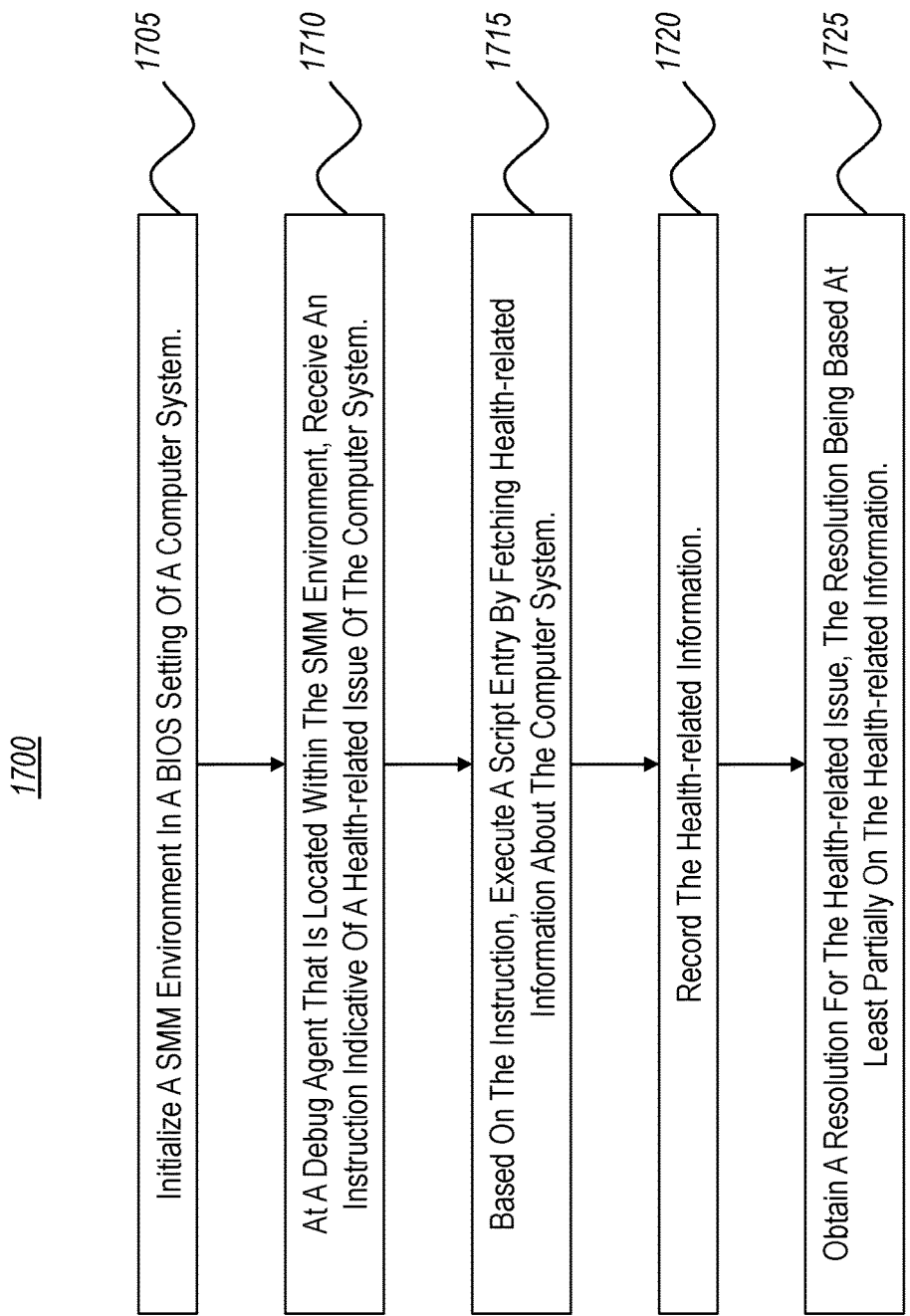
FIG. 17 illustrates an example method for identifying a health status of a computer system.

FIG. 17 shows an example method 1700 for determining the chipset-specific or platform-specific health issues of a computer system. Initially, method 1700 includes an act of initializing a SMM environment in a BIOS setting of a computer system (act 1705). Here, this act may be performed by the SMM Component 1505 of the computer system 1500 of FIG. 15.

Method 1700 also includes an act of receiving (at the debug agent, which is located within the SMM environment) an instruction indicative of a health-related issue of the computer system (act 1710). Here, this act is performed by the debug agent 1510 of the computer system 1500. In some circumstances, the instruction is a SMI that includes a script entry, as discussed above.

In other circumstances, the instruction may identify a port that is associated with a stored package. In this scenario, a system administrator has developed a custom script entry and stored the custom script entry as a package, which is accessible via the port.

In yet another circumstance, the instruction simply "hints" that there is a health-related issue. From this hint, the debug agent understands that it is being tasked with creating an experiment in order to learn what the specific issue is (i.e. it is to operate in its auto mode). To do so, the debug agent is able to query a database/library of existing scripts and to select one or more of those scripts (or dynamically create a new script) in order to perform the experiment.

In some instances, an authentication procedure is performed on the received instruction to verify that the instruction is not malicious. In such situations, the authentication component 1605 of the debug agent 1600 is able to perform the authentication.

Based on the instruction, the debug agent executes a script entry (act 1715). This process of executing the script entry comprises fetching health-related information about the computer system. In some instances, this health-related information includes health-related metadata or counter information about the computer system's chipset or underlying platform. Here, this act is performed by the script component 1615 of the debug agent 1600 shown in FIG. 16.

In some circumstances, executing the script is performed simultaneously with an execution of a computer program on the computer system. As a result, the process of fetching the health-related information includes determining a health-status of the computer system while the computer program is executing. Here, an example will be helpful. Suppose that the system administrator determines that a health-related problem arises when a particular computer program executes. In order to better understand the problem, the embodiments are able to perform an experiment while the computer program is executing in order to determine what the problem actually is. Accordingly, the processes described herein may be performed during the simultaneous execution of a particular computer program and the execution of an experiment.

In some instances, the instruction simply includes a high-level overview of what the system administrator believes the problem to be. In other words, the instruction includes a hinting at what the administrator believes the health-related problem is. Here, the debug agent includes an auto mode (e.g., which is executed by the auto mode component 1610 of the debug agent 1600). This auto mode is a mode where the debug agent is able to independently select a script entry from a database (e.g., database 1625 of the debug agent 1600) that the debug agent maintains (or to dynamically create a new script entry). In this manner, the debug agent executes a script entry of its own choosing/making.

The debug agent then records the health-related information (act 1720). Here, this act is performed by the script component 1615 of the debug agent 1600. In some instances, the information is recorded in the script entry (as illustrated in FIG. 11).

Method 1700 then includes an act where the debug agent obtains a resolution for the health-related issue (act 1725). Here, this resolution is based, at least in part, on the health-related information. This act is performed by the script component 1615. In some instances, the resolution is generated by the debug agent itself while in other instances the resolution is generated by the system administrator and then delivered to the debug agent for processing.

As indicated earlier, the debug agent includes an auto mode component 1610 that enables the debug agent to select (or dynamically create) script entries and then attempt to resolve issues on its own. Of note, the debug agent also includes a machine learning component 1620. In this manner, the debug agent is able to perpetually learn new methods for identifying and resolving issues. As a result, each time a resolution is performed, the machine learning component 1620 records information about these resolutions so as to enable the debug agent to use these same resolutions, or even modifications of these resolutions, at a later time when the debug agent again encounters new or repeating health-related issues.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable hardware storage devices having stored thereon computer-executable instructions that, when executed by the one or more processors, cause the computer system to:
initialize a system management mode (SMM) environment in a basic input/output system (BIOS) setting of the computer system;
at a debug agent that is located within the SMM environment, receive an instruction indicative of a health-related issue of the computer system;
based on the instruction, cause the debug agent to execute a script entry, wherein executing the script entry comprises fetching health-related information about the computer system, the health-related information including health-related metadata and/or counter information about the computer system;
cause the debug agent to record the health-related information; and
cause the debug agent to obtain a resolution for the health-related issue, the resolution being based at least partially on the health-related information.

2. The computer system of claim 1, wherein the debug agent authenticates the received instruction prior to executing the script entry.

3. The computer system of claim 2, wherein authenticating the received instruction includes (1) determining a signature associated with the received instruction and (2) challenging the signature to determine whether the signature is associated with a valid private key.

4. The computer system of claim 1, wherein the script entry delineates an experiment that is to be performed by the computer system to determine a health status of the computer system, whereby the experiment describes the health-related information that is to be fetched, and wherein the script entry includes a metadata section, a script section, and a results section.

5. The computer system of claim 4, wherein the metadata section describes a scope of the experiment, wherein the script section describes logic that is to be performed, and wherein the results section includes a first section where results of the experiment are stored and a second section where the debug agent, based on its machine learning, stores additional information that the debug agent determines is relevant to the experiment.

6. The computer system of claim 1, wherein fetching the health-related information includes querying a set of standard interfaces, the set of standard interfaces comprising a CPMSR, a VCI, or a CSR.

7. The computer system of claim 1, wherein executing the script entry is performed simultaneously with an execution of a computer program on the computer system, and wherein fetching the health-related information includes determining a health status of the computer system while the computer program is executing on the computer system.

8. The computer system of claim 1, wherein the debug agent includes an auto mode, the auto mode being a mode where the debug agent independently determines the resolution for the health-related issue and where the debug agent independently applies the resolution in an attempt to fix the health-related issue, whereby the debug agent determines the resolution and applies the resolution without additional input from a system administrator.

9. The computer system of claim 1, wherein the debug agent has associated therewith a database that includes a plurality of pre-generated script entries, and wherein the debug agent selects the script entry based on the received instruction.

10. The computer system of claim 1, wherein the script entry is associated with the received instruction, the script entry having been scripted by a system administrator, whereby the script entry that is executed by the debug agent was scripted by the system administrator.

11. The computer system of claim 1, wherein the received instruction is a system management interrupt (SMI).

12. The computer system of claim 11, wherein the SMI identifies a port, wherein a package is located in the port, the package matching a signature of the debug agent such that the debug agent is able to open the package, and wherein the package includes the script entry that is to be executed by the debug agent.

13. One or more hardware storage devices having stored thereon computer-executable instructions that, when executed by one or more processors of a computer system, cause the computer system to:
- initialize a system management mode (SMM) environment in a basic input/output system (BIOS) setting of the computer system;
- at a debug agent that is located within the SMM environment, receive an instruction indicative of a health-related issue of the computer system;
- based on the instruction, cause the debug agent to execute a script entry, wherein executing the script entry comprises fetching health-related information about the computer system, the health-related information including health-related metadata or counter information about the computer system;
- cause the debug agent to record the health-related information; and
- cause the debug agent to obtain a resolution for the health-related issue, the resolution being based at least partially on the health-related information.

14. The one or more hardware storage devices of claim 13, wherein the debug agent, based on its machine learning, records additional health-related information, the additional health-related information being information that was not generated as a result of executing the script entry but rather being additional information that the debug agent determines is relevant to the health-related issue identified by the received instruction.

15. The one or more hardware storage devices of claim 13, wherein fetching the health-related information includes fetching one or more opcodes or protocols associated with the computer system.

16. The one or more hardware storage devices of claim 13, wherein fetching the health-related information includes querying a plurality of hardware platform endpoints, the plurality of hardware platform endpoints includes a central processing unit (CPU), memory, and input/output (IO) hardware.

17. A method for determining a health state of a computer system, the method being implemented by one or more processors of the computer system, the method comprising:
- initializing a system management mode (SMM) environment in a basic input/output system (BIOS) setting of the computer system;
- at a debug agent that is located within the SMM environment, receiving an instruction indicative of a health-related issue of the computer system;
- based on the instruction, causing the debug agent to execute a script entry, wherein executing the script entry comprises fetching health-related information about the computer system, the health-related information including health-related metadata or counter information about the computer system;
- causing the debug agent to record the health-related information; and
- causing the debug agent to obtain a resolution for the health-related issue, the resolution being based at least partially on the health-related information.

18. The method of claim 17, wherein fetching the health-related information includes fetching service opcodes to learn system state and health indicators of the computer system.

19. The method of claim 17, wherein the debug agent has associated therewith a library of pre-generated scripts, the script entry being selected from the library of pre-generated scripts, and wherein the script entry is selected based on the health-related issue that is identified in the received instruction.

20. The method of claim 17, wherein fetching the health-related information comprises obtaining metadata that describes a health status of the computer system.

* * * * *